Dec. 25, 1923.                                           1,478,513
P. H. GASKINS
LUBRICATING SYSTEM
Filed March 29, 1922       2 Sheets-Sheet 2
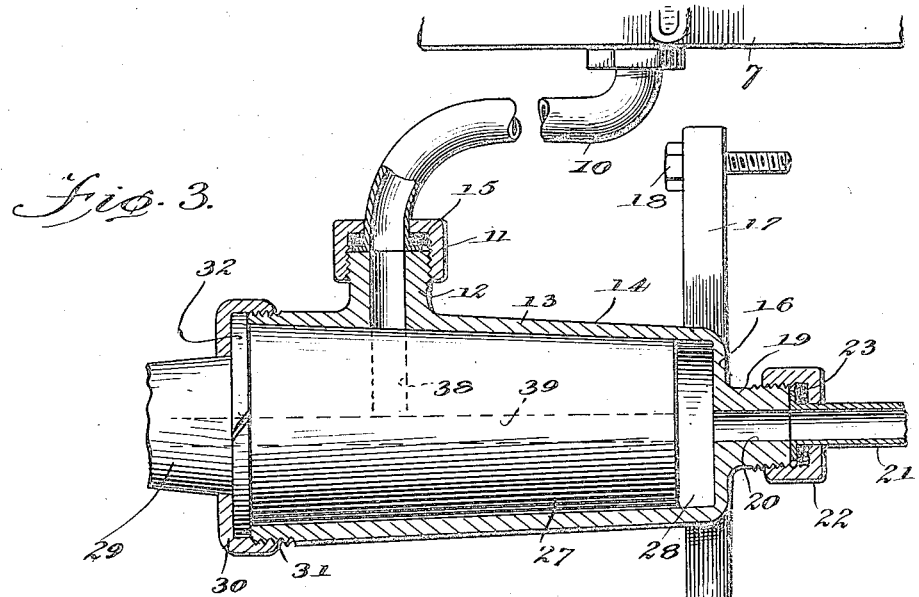
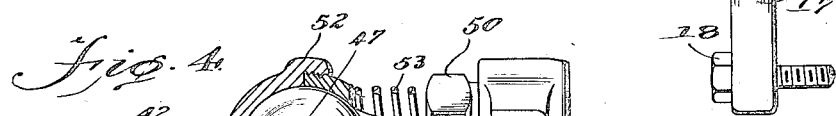
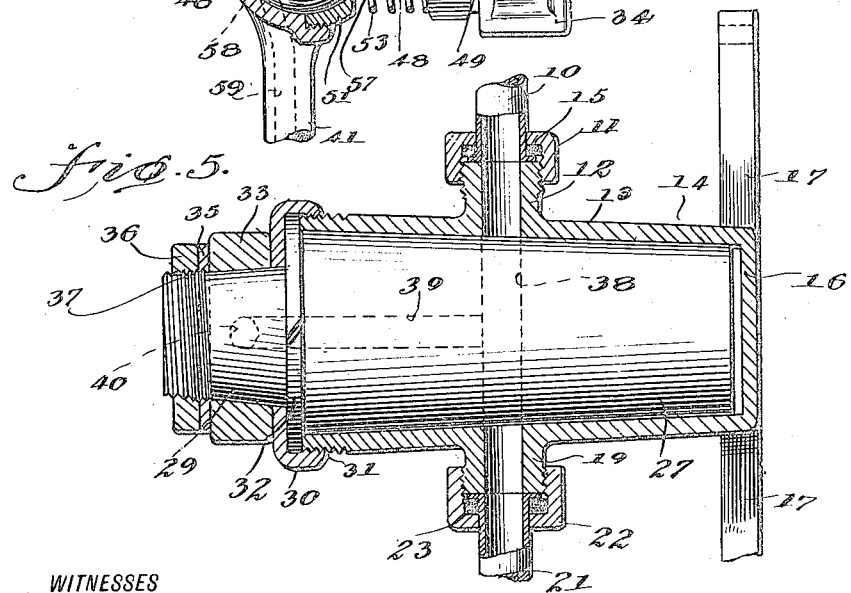
WITNESSES
INVENTOR
P. H. Gaskins,
BY
ATTORNEYS Patented Dec. 25, 1923.

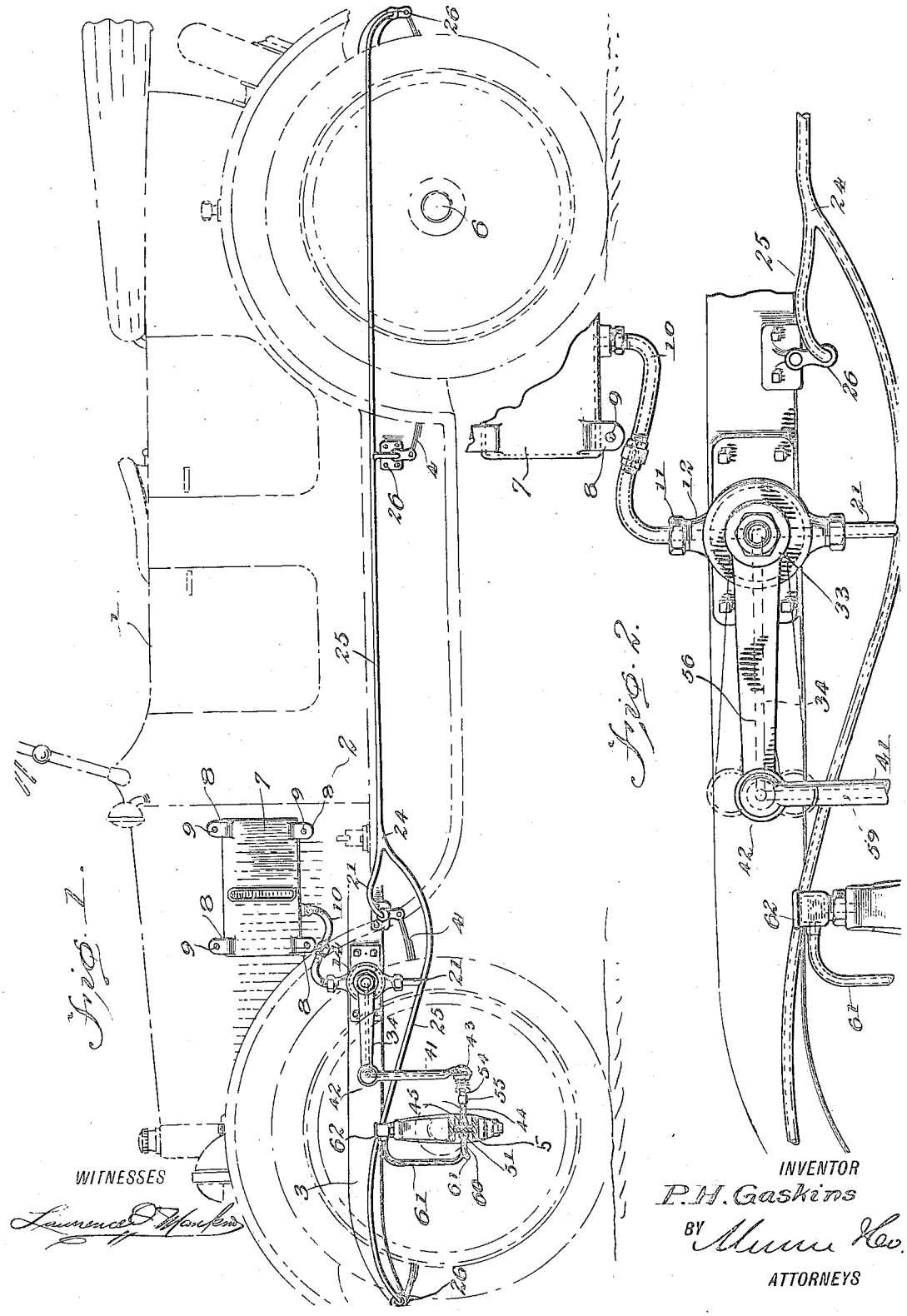

1,478,513

UNITED STATES PATENT OFFICE.

PALEMON H. GASKINS, OF JACKSONVILLE, FLORIDA.

LUBRICATING SYSTEM.

Application filed March 29, 1922. Serial No. 547,827.

*To all whom it may concern:*

Be it known that I, PALEMON H. GASKINS, a citizen of the United States, and a resident of Jacksonville, in the county of Duval and State of Florida, have invented certain new and useful Improvements in Lubricating Systems, of which the following is a specification.

My invention relates to lubricating systems adapted for application to motor vehicles and comprising means for supplying a lubricating fluid to bearings for moving elements of the vehicle, and like parts, and it consists in the combinations, constructions and arrangements herein described and claimed.

An object of my invention is to provide a lubricating system of the character described in which the flow of a lubricant therethrough is controlled by means arranged to be actuated by a flexibly supported part of the vehicle to which applied, as for instance by the body thereof.

A further object of my invention is to provide in a device of the character described a novel means for controlling the flow of a lubricant through the system to desired places.

A still further object of my invention is to provide a lubricating system of the character described which includes means for conducting a lubricant to parts of two flexibly spaced elements of the vehicle to which applied, and which includes means controlled by the motion of the flexibly spaced elements relatively to each other to control the flow of the lubricant through the system.

Other objects and advantages will be apparent from the following description, and the novel features of the invention will be particularly outlined in the appended claims.

My invention is illustrated in the accompanying drawings, forming a part of this application, in which:—

Fig. 1 is a view, showing more or less diagrammatically a vehicle equipped with my invention, Fig. 2 is an enlarged fragmentary view showing in side elevation a portion of the structure exhibited in Fig. 1, Fig. 3 is a detail view, mainly in vertical section and partly in side elevation, showing a control member which may be comprised in the embodiment of the invention illustrated in the preceding views, Fig. 4 is an enlarged fragmentary view, partly in side elevation and partly in section, showing a joint and appurtenant parts comprised in the device, and Fig. 5 is a view similar to Fig. 3, showing a modified form of the control member exhibited in the latter.

Referring now to the drawings, and particularly to Fig. 1 thereof, an automobile 1 of conventional construction is shown more or less diagrammatically. The automobile 1 includes a body 2 secured to a frame 3 flexibly supported, as by means of springs 4 upon front and rear axles 5 and 6 respectively, and thus being normally spaced from the latter.

In Fig. 1, the front axle 5 is shown in section and a practical embodiment of my invention is illustrated as having connection therewith, as will hereinafter appear. The embodiment of the invention illustrated includes a reservoir or container 7 provided with lugs 8 apertured to receive bolts 9 or like fastening means, whereby the reservoir may be secured to the body of the vehicle above the level of the parts of the vehicle to which a lubricant is to be supplied. A supply conduit 10 leads from the lower side of the reservoir 7 and is secured by means of a union nut 11 to a pipe connection 12 upstanding from the casing 13 of a control member which is indicated generally at 14. The supply conduit 10 is in open communication at its upper end with the interior of the reservoir 7 and communicates at its lower end through the pipe connection 12 with the interior of the casing 13, suitable packing elements 15 being arranged between the union nut 11 and the pipe connection 12, if desired.

The casing 13 is smaller diametrically at one end than at the other end thereof, and tapers uniformly from its larger to its smaller end. A head 16 at the smaller end of the casing is preferably formed integrally with the side walls of the casing and is provided with laterally extending arms 17—17 apertured adjacent to their ends to receive bolts 18, or the like, whereby the casing 13 may be secured to a suitable support. In the present instance, the casing 13 is illustrated as secured to the frame 3 of the vehicle 1 below the level of the reservoir 7 and between the latter and the front axle 5.

The head 16 has a boss 19 formed thereon centrally thereof in the form of a nipple or pipe connection having a bore 20 communicating with a delivery conduit 21 which is clamped to the outer end of the pipe connection 19 by means of a union nut 22, a suitable packing member 23 being interposed between the union nut and the end of the pipe connection 19.

The delivery conduit 21 communicates at any desirable place, as at 24, with branch delivery conduits 25 which lead to the parts of the vehicle carried by the body or the frame to which a lubricant is to be supplied, as for instance to the spring shackles indicated at 26.

Rotatably disposed within the casing 13 is a valve 27. The valve 27 is formed externally to conform in contour to the curvature of the inner wall of the casing 13 and to have a substantially liquid-tight fit therewith when arranged within the casing with the outer or larger end thereof substantially flush with the larger end of the casing, whereby the smaller end of the valve 27 will be spaced from the head 16 to provide a compartment or chamber 28 which communicates with the bore or passage through the boss 19. A stem 29 of the valve is preferably integral with the latter and extends from the larger end thereof in axial alinement therewith, being tapered toward its outer end, as shown. The stem 29 extends through a cap 30 which threadedly engages the casing 13 at 31 and clamps a spring washer 32 against the shoulder defined at the juncture of the valve 27 and the stem 29, thus tending to resist axial movement of the valve 27 out of liquid-tight contact with the casing 13. The hub 33 of a rocker arm 34 is securely held upon the valve stem 29 by means of a jam nut 35 and a lock nut 36 threadedly engaging the valve stem, as at 37, or by any other suitable known means. The arrangement is such that the valve stem 29 and consequently the valve 27, will be rotated when the rocker arm 34 is rocked about the longitudinal axis of the valve stem. The valve 27 is provided with a radial opening or passage 38 communicating at its inner end with an axial bore 39 which extends through the valve 27 into communication at one end with the chamber 28 and into communication at the other end thereof with a transverse passage 40 extending radially through the valve stem to the exterior of the latter. The arrangement is such that the outer end of the transverse passage 38 is in registry with the inner end of the bore of the pipe connection 12 when the valve 27 has been arranged in or rotated to a certain position in the casing 13. It will be apparent that when the valve 27 is in position to occasion the complete or partial registry of the passage 38 with the pipe connection 12, a lubricant from the reservoir 7 will be permitted to pass through the control member 14 to the delivery conduit 21. It will be understood also that the volume of lubricant permitted to flow through the control member 14 will be varied as the valve 27 is rotated to move the passage 38 toward or away from complete registry with the pipe connection 12. Moreover, it will be apparent that the flow of a lubricant through the control member 14 will be stopped when the valve 27 has been rotated until the passage 38 no longer is in communication with the pipe connection 12.

It is desirable that the means for rocking the arm 34 to rotate the valve 27 should be controlled by the motion of the body and frame as a unit relatively to the axles which carry the ground wheels, so that the flow of lubricant through the relatively moving parts of the vehicle may be increased as the speed of the vehicle increases and as the movement of the body and frame as a unit relatively to the axles increase in extent. To this end, a connecting rod 41 is connected at its upper end by means of a ball and socket joint 42 to the outer end of the rocker arm 34 and is connected at its lower end by a similar ball and socket joint 43 to a hollow bolt 44 which extends transversely through the axle 5 and is secured to the latter, as by means of the nuts 45 in threaded engagement with the bolt upon opposite sides of the axle. The arrangement is such that when the body 1 and the frame 3 move as a unit relatively to the axle 5, the connecting rod 41 will be moved in the direction of its length relatively to the rocker arm 34, thereby rotating the valve 27 and regulating the flow of a lubricant through the control member 14.

The ball and socket joints 42 and 43 are identical in construction in essential respects, and are of special construction. In Fig. 4, the ball and socket joint 42 is illustrated in detail and it is believed that a description of the parts thereof will suffice also as a description of the construction of the ball and socket joint 43. The connecting rod 41 is provided at its upper end with a substantially hemispherical socket 46 in which is disposed the ball head 47 of the shank 48 which is in threaded engagement at its end remote from the ball with a socket 49 formed in a side of the rocker arm 34 at the outer end of the latter. A lock nut 50 upon the shank 48 holds the latter against movement from adjusted position in respect to the rocker arm 34. A retaining ring 51 having the inner face thereof curved to conform in longitudinal sectional contour with the curvature of the ball head 47, threadedly engages the flange 52 on the edge of the socket 46 and holds the ball head 47 against displacement from the socket. A coiled expansion spring 53 disposed on the shank 48 between the nut 50 and the retaining ring 51, reacts against the latter and tends to hold the same in adjusted position in respect to the socket 46. It is to be observed at this point that the diameter of the opening at the outer end of the retaining ring 51 is greater than the diameter of the shank 48 at the juncture of the latter with the ball head and in consequence, the connecting rod 41 has limited universal movement in respect to the shank 48 and consequently in respect to the rocker arm 34.

As stated in the foregoing, the ball and socket joint 43 is identical in essential respects with the ball and socket joint 42 and the connecting rod 41 therefore has a limited universal movement in respect to a shank 54 of the ball and socket joint 43, which shank is connected at 55 with the bolt 44.

The radially extending passage 40 through the valve stem 29 is in registry at its outer end with a longitudinal bore or passage 56 through the rocker arm 34. The latter communicates at its outer end with a passage 57 extending longitudinally of the shank 48 into the ball head 47 and then being turned downwardly so that its outer end will communicate at 58 with a bore or passage 59 extending through the connecting rod 41. The latter extends through the ball and socket joint 43 and communicates with the bore of the hollow bolt 44. The nut 45 at the side of the axle 5 remote from the ball and socket joint 43, serves as a union nut and connects the hollow bolt 44 with a delivery conduit 60 which has branches, such as indicated at 61. One of the branches 61 is shown as leading to an oil cup 62 communicating with an axle spindle. It will be understood that the branches 61 may be arranged as desired, so that parts associated with the axle structure may be lubricated.

From the foregoing description of the various parts of the device, the operation thereof may be readily understood. The valve 27 is initially adjusted so that the transverse bore 38 will be out of registry at its upper end with the pipe connection 12, which constitutes the inlet of the casing 13. This condition obtains when the vehicle to which the system is applied, is at a standstill. When the car is in motion, the oscillation of the body 1 and the frame 3 relatively to the axle 5, will occasion a rocking of the arm 34, which will rotate the valve 27 so that the passage 38 will be in registry at its upper end with the inlet 12 and will approach complete registry therewith as the movements of the body and frame of the vehicle as a unit increase in extent in respect to the axle 5. When the upper end of the passage 38 is in partial or complete registry with the inlet 12, a lubricant from the reservoir 7 will be fed to the parts carried by the frame and body to which the branch delivery tube 25 extends and will also be fed to the rocker arm 34, the ball and socket joint 42, the connecting rod 41, the ball and socket joint 43, the hollow bolt 44, the delivery conduit 60, and the branch delivery conduits 61 to parts carried by the axle 5 as distinguished from parts carried by the body 1 and the frame 3 which are movable in respect to the axle. The flow of the lubricant through the delivery conduits described will vary directly in proportion to the movement of the body 1 and frame 3 as a unit, in respect to the axle 5, as will be understood from the foregoing. A greater volume of lubricant will be fed to the delivery conduits as the speed of the vehicle increases since the oscillatory movements of the body and frame 1 will be correspondingly increased. Moreover, the relatively great oscillatory movements of the body and frame relatively to the axle occasioned by unevenness of a surface traversed by the vehicle, will be attended by a relatively great flow of lubricant through the delivery conduits irrespective of the speed of the vehicle.

In Fig. 5, the transverse bore or passage 38 is shown as extending through the valve 27 and the longitudinal bore or passage 39 extends only from the transverse median line of the valve toward the larger end of the valve and into the valve stem 29 into communication with the transverse bore through the latter. The pipe connection 19 of the casing 13 extends laterally of the casing 13 at a point diametrically opposite the pipe connection 12 in the form of control member illustrated in Fig. 5. The pipe connection 19 in the modified form of the control member, as illustrated in Fig. 5, constitutes the outlet for the casing 13 and the lower end of the transverse bore 38 is in partial or complete registry therewith to the same degree that the upper end of the transverse passage 38 is in partial or complete registry with the inlet 12.

The operation of the system when the form of control member illustrated in Fig. 5 is comprised therein, instead of the control member illustrated in Fig. 3, is identical in essential respects with the operation hereinbefore described and in consequence, it is thought that no further description thereof will be necessary herein.

Obviously, my invention is susceptible of embodiment in forms other than those in which illustrated in the accompanying drawings, and I therefore consider as my own, all modifications and adaptations of the forms herein illustrated and described as fairly fall within the scope of the appended claims.

I claim:—

1. In combination, two relatively movable flexibly spaced parts, a source of lubricating fluid supply supported upon one of said parts, a control member supported upon the same part at a level lower than that of the source of supply, means for conducting lubricant from the source of supply to said control member, and means flexibly connecting the control member with the second of said parts for conducting lubricant from the control member to the second of said parts and for actuating the control member to regulate the flow of lubricant through the latter.

2. In combination, two relatively movable flexibly spaced parts, a source of lubricating fluid supply supported upon one of said parts, a control member supported upon the same part at a level lower than that of the source of supply, means for conducting lubricant from the source of supply to said control member, and means flexibly connecting the control member with the second of said parts for conducting lubricant from the control member to the second of said parts and for actuating the control member to regulate the flow of lubricant through the latter, said control member actuating means being controlled by the movement of the said two parts in respect to each other.

3. In a device of the character described, a source of lubricating fluid supply, means connecting with said source of supply for conducting lubricant therefrom, said means including a control member positioned at a lower level than the source of supply and comprising a tapered casing provided with spaced apart inlet and outlet portions, a conduit leading from the source of supply to the inlet of the casing, a tapered valve disposed within the casing and adapted to establish communication at times between the inlet and the outlet of the latter, and means for operating the valve to regulate the flow of lubricant through the casing.

4. In a device of the character described, a source of lubricating fluid supply, means connecting with said source of supply for conducting lubricant therefrom, said means including a control member positioned at a lower level than the source of supply and comprising a tapered casing provided with spaced apart inlet and outlet portions, a conduit leading from the source of supply to the inlet of the casing, a tapered valve disposed within the casing and adapted to establish communication at times between the inlet and the outlet of the latter, and automatic means for operating the valve to regulate the flow of lubricant through the casing.

PALEMON H. GASKINS.